United States Patent
Sobek et al.

(10) Patent No.: US 10,072,156 B2
(45) Date of Patent: Sep. 11, 2018

(54) MATTE TEXTURED POWDER MONOCOAT COATING COMPOSITIONS

(75) Inventors: Susan Marie Sobek, Brunswick, OH (US); Susan Margaret Miller, North Royalton, OH (US)

(73) Assignee: Akzo Nobel Coatings International B.V. (NL)

(*) Notice: Subject to any disclaimer, the term of this patent is extended or adjusted under 35 U.S.C. 154(b) by 315 days.

(21) Appl. No.: 13/882,420

(22) PCT Filed: Nov. 2, 2011

(86) PCT No.: PCT/EP2011/069195
§ 371 (c)(1),
(2), (4) Date: Apr. 29, 2013

(87) PCT Pub. No.: WO2012/059490
PCT Pub. Date: May 10, 2012

(65) Prior Publication Data
US 2013/0216785 A1   Aug. 22, 2013

Related U.S. Application Data

(60) Provisional application No. 61/409,312, filed on Nov. 2, 2010.

(30) Foreign Application Priority Data

Dec. 17, 2010  (EP) .................................. 10195681

(51) Int. Cl.
*C09D 5/00* (2006.01)
*C09D 5/03* (2006.01)
(Continued)

(52) U.S. Cl.
CPC ................. *C09D 5/00* (2013.01); *C09D 5/03* (2013.01); *C09D 5/032* (2013.01); *C09D 133/02* (2013.01);
(Continued)

(58) Field of Classification Search
CPC .......... C09D 5/00; C09D 133/02; C09D 5/03; C09D 5/032; C09D 5/036; C09D 133/08;
(Continued)

(56) References Cited

U.S. PATENT DOCUMENTS 5,856,378 A   1/1999  Ring et al.
7,041,737 B2  5/2006  Nicholl et al.
(Continued)

FOREIGN PATENT DOCUMENTS

CA   2353041 A1   1/2002
CN   1308658 A    8/2001
(Continued)

OTHER PUBLICATIONS

English Abstract of DE 102007047586A1.
(Continued)

*Primary Examiner* — Samir Shah
*Assistant Examiner* — Jasper Saberi
(74) *Attorney, Agent, or Firm* — Nirav P. Patel

(57) ABSTRACT

The present invention includes matte textured powder monocoat coating compositions that can be used to coat substrates, such as automobile bodies, and methods of coating such substrates. A powder coating composition may comprise an acrylic resin, a UV light stabilizer, a matting agent, and a texturing additive, wherein the cured powder coating composition transmits less than about 0.1% of UV light at 290 nm and less than about 0.5% of UV light at 400 nm.

12 Claims, 1 Drawing Sheet

(51) Int. Cl.
*C09D 133/06* (2006.01)
*C09D 133/02* (2006.01)

(52) U.S. Cl.
CPC ....... *C09D 133/06* (2013.01); *C09D 133/064* (2013.01); *C09D 133/066* (2013.01); *Y10T 428/24405* (2015.01)

(58) Field of Classification Search
CPC ..... Y10T 428/24405; Y10T 428/24479; Y10T 428/24355; B32B 3/263; B32B 33/00; B32B 2264/12; B32B 2307/71
USPC .................................................. 427/261, 257
See application file for complete search history.

(56) References Cited

U.S. PATENT DOCUMENTS

| | | | |
|---|---|---|---|
| 2001/0038910 A1* | 11/2001 | MacQueen et al. | 428/327 |
| 2003/0166787 A1* | 9/2003 | Rechenberg et al. | 525/326.2 |
| 2006/0111492 A1 | 5/2006 | Schmalzl et al. | |
| 2008/0233300 A1* | 9/2008 | Cinoman et al. | 427/386 |
| 2013/0216785 A1 | 8/2013 | Sobek et al. | |
| 2016/0032040 A1 | 2/2016 | Craun et al. | |

FOREIGN PATENT DOCUMENTS

| | | |
|---|---|---|
| CN | 101161746 A | 4/2008 |
| CN | 101353546 A | 1/2009 |
| DE | 10 2007 047 586 A1 | 4/2009 |
| EP | 0045040 A2 | 2/1982 |
| EP | 0544206 | 6/1993 |
| EP | 0806458 | 11/1997 |
| EP | 1176175 A2 | 1/2002 |
| EP | 1911820 A1 | 4/2008 |
| EP | 2236541 A1 | 10/2010 |
| JP | 54-040831 | 3/1979 |
| JP | 54040831 | 3/1979 |
| WO | WO2004/005414 A1 | 1/2004 |
| WO | WO 2008/135287 | 11/2008 |
| WO | WO2009/013064 A2 | 1/2009 |
| WO | WO2009/047102 A2 | 4/2009 |
| WO | WO2009/115079 A1 | 9/2009 |

OTHER PUBLICATIONS

English Abstract of DE 102007034865A1.
English Abstract of JP 54040831.
Search Report of EP Application No. 10195681.1, dated Jun. 29, 2011.
Search Report of International Patent Application No. PCT/EP2011/069195, dated Jan. 23, 2012.
Search Report of EP Application No. 10195682.9, dated Feb. 4, 2011.
Search Report of International Patent Appilcation No. PCT/EP2011/069196, dated Mar. 13, 2012.

* cited by examiner

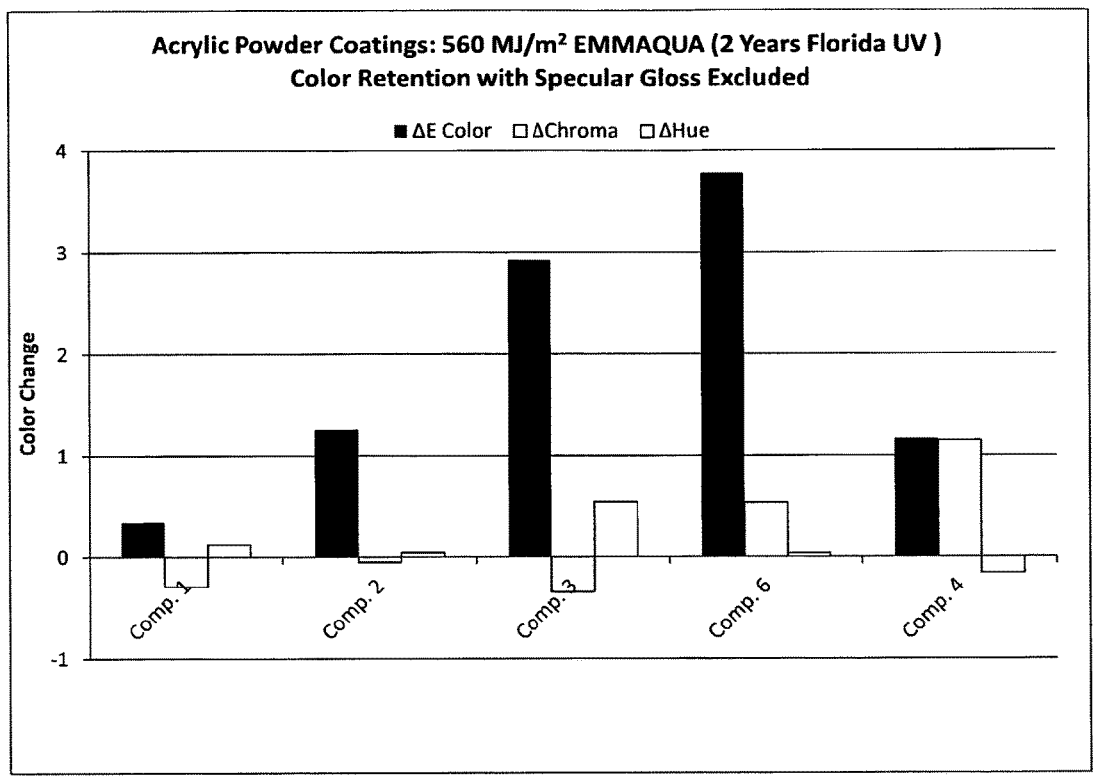

MATTE TEXTURED POWDER MONOCOAT COATING COMPOSITIONS

This application is a National Phase Application of PCT Application No. PCT/EP2011/069195, filed Nov. 2, 20111, and claims the benefit of priority to U.S. Provisional Patent Application No. 61/409,312, filed on Nov. 2, 2010 and EP Application No. 10195681.1, filed on Dec. 17, 2010. Each of these applications is hereby incorporated by reference in its entirety herein.

BACKGROUND OF THE INVENTION

Field of the Invention

The present invention includes matte textured acrylic powder monocoat coating compositions that can be used to coat substrates, such as automobile bodies, and methods of coating such substrates.

SUMMARY OF THE INVENTION

The present invention includes matte textured acrylic powder monocoat coating compositions that can be used to coat substrates, such as automobile bodies, and methods of coating such substrates with the matt textured acrylic powder monocoat coating compositions.

One of the differences between automobile body coatings and exterior trim coatings is durability. For many OEM body coating specifications, the expectation is that the coating will maintain appearance and functional film integrity for 5+ years in Florida exposure. For high quality exterior trim coatings, the requirements are not as stringent for duration of exposure and functional film integrity after exposure. For example, some OEM body coating requirements call for gloss retention of at least about 90% after 1 year of Florida exposure, at least about 80% after 3 years of Florida exposure, and at least about 65% after 5 years of Florida exposure. For exterior trim coatings, the related durability requirements are at least about 80% gloss retention after 1 year of Florida exposure, at least about 50% after 3 years of Florida exposure, and no requirement after 5 years of Florida exposure. The coating compositions of the present invention satisfy one or more of these requirements.

In one embodiment of the invention, a powder coating composition comprises an acrylic resin, a UV light stabilizer, a matting agent, and a texturing additive, wherein the cured powder coating composition transmits less than about 0.1% of UV light at 290 nm and less than about 0.5% of UV light at 400 nm. The invention also includes methods of coating a substrate comprising applying a powder coating composition to the substrate and curing the powder coating composition.

DETAILED DESCRIPTION OF THE INVENTION

The present invention includes matte textured acrylic powder monocoat coating compositions that can be used to coat substrates and methods of coating such substrates with the matte textured acrylic powder monocoat coating compositions. The coated and cured powder coating compositions are matte, have a fine texture and satisfy automotive industry standards for UV transmission, chemical resistance and durability. In some embodiments, an electrocoat is applied to the substrate, and the powder coating compositions of the invention is applied over the electrocoat. Thus, the present invention also includes substrates coated with a dual-coat coating composition, the dual-coat coating composition having an electrocoat coating between the substrate and a powder coating composition of the present invention.

A powder coating composition of the present invention may comprise an acrylic resin, a UV light stabilizer, a matting agent, and a texturing additive. Suitable acrylic resins include, without limitation, a glycidyl methacrylate acrylic resin, a carboxyl acrylic resin, a hydroxyl acrylic resin, and combinations thereof.

In some embodiments, the acrylic resin is present in an amount of from about 25 to about 65 wt % of the powder coating composition. The acrylic resin may include a glycidyl methacrylate acrylic resin, a carboxyl acrylic resin, a hydroxyl acrylic/tetramethoxymethyl glycoluril resin, or a combination thereof in certain embodiments of the invention. For non-limiting example, the acrylic resin may include a glycidyl methacrylate acrylic resin in an amount of from about 30 to about 45 wt % of the coating composition, a carboxyl acrylic resin in an amount of from about 40 to about 70 wt % of the coating composition, a carboxyl acrylic resin/glycidyl methacrylate acrylic resin system in an amount of from about 50 to about 70 wt % of the coating composition (wherein the carboxyl acrylic resin is present in an amount of from about 40 to about 70 wt % of the coating composition and the glycidyl methacrylate acrylic resin is present in an amount of from about 5 to about 15 wt % of the coating composition), a hydroxyl acrylic resin or combination of hydroxyl acrylic resins in an amount of from about 30 to about 70 wt % of the coating composition, a hydroxyl acrylic/tetramethoxymethyl glycoluril resin in an amount of from about 45 to about 75 wt % of the coating composition, or a combination thereof. In some embodiments, the acrylic resin is a weatherable resin that contains polar modification to enhance pigment wetting and adhesion.

In some embodiments, the powder coating composition includes one or more compounds that function as a curing agent and/or as a co-reacting resin. The curing agent and/or co-reacting resin may include, for non-limiting example, an aliphatic polyanhydride, a dibasic acid such as without limitation dodecanedioic acid or sebacic acid, a hydroxyalkylamide, triglycidyl isocyanurate, a low epoxy equivalent weight (EEW) glycidyl methacrylate acrylic resin, such as a resin having an EEW of about 250 to about 400, a polyester resin, a hydrogenated Bisphenol A epoxy resin, a tetramethoxymethyl glycoluril, a polyisocyanate curing agent, or a combination thereof. In some embodiments of the invention, the curing agent and/or co-reacting resin is present in an amount of from about 2 to about 30 wt % of the coating composition.

Suitable UV light stabilizers for use in the present invention include without limitation hydroxyphenyl benzotriazole, a hindered amine light stabilizer, an oxalanilide, a hydroxybenzophenone, a hydroxyphenyl-s-triazine, or a combination thereof. In some embodiments of the invention, the UV light stabilizer may be present in an amount of from about 0.1 to about 5 wt % of the powder coating composition, or from about 1 to about 3 wt % of the coating composition. The UV light stabilizer may be used to contribute to optimum weathering and UV transmission requirements.

In some embodiments of the invention, a powder coating composition having a UV light stabilizer satisfies UV transmission targets for automotive body coatings. For non-limiting example, a cured coating composition of the invention may transmit less than about 0.1% of UV light at 290 nm and less than about 0.5% of UV light at 400 nm.

The powder coating compositions of the invention can include a matting agent in some embodiments which may provide a matte appearance to the cured powder coating composition, such as when the cured coating composition exhibits a 60° gloss of less than about 10. The matting agent may include, without limitation, barium sulfate, magnesium silicate, silicon dioxide, an alumino silicate, such as without limitation anhydrous sodium potassium alumino silicate, an alkali alumino silicate ceramic microsphere, an alumino silicate glass microsphere or flake, a polyolefin wax in combination with the salt of an organic anion, a polymeric wax additive, or a combination thereof. The matting agent may contribute to good dispersion and handling of the texturing additive and/or to contribute to restrict the flow of the coating composition. In some embodiments of the invention, the matting agent is present in an amount of from about 0.1 to about 40% of the coating composition.

In some embodiments, the powder coating composition includes a texturing additive to provide a texture to the cured coating, such as when the cured coating composition exhibits a rough, rippled or sandy appearance, as opposed to a smooth or orange peel appearance. The texturing additive may include, for non-limiting example, polytetrafluoroethylene powder, PTFE/polyethylene wax mixtures, PTFE/talc mixtures, or a combination thereof. The polytetrafluoroethylene powder may be present in an amount of from about 0.05 to about 0.5 wt % of the coating composition, or from about 0.1 to about 0.2 wt % of the coating composition. In some embodiments, the polytetrafluoroethylene powder is a granular powder having a particle size of from about 5 to about 600 microns in average particle size, and alternatively from about 5 to about 25 microns in average particle size.

The powder coating compositions of the invention may be applied over an electrocoat to protect the electrocoat from UV degradation. The powder coating compositions may have a non-uniform thickness with hills and valleys, and the coated powder coating compositions can have a measured film thickness (when measuring the top of the hills) of about 35 to about 200 μm or about 50 to about 100 μm in some embodiments. In some coating compositions of the invention, the valley:hill thickness ratio is about 1:3 or from about 1:4 to about 1:2. A measured film thickness within the range of the present invention helps prevent UV light from penetrating through the valleys of the coating and reaching the underlying electrocoat. As a result, the thickness of the powder coating composition contributes to the stability of the underlying electrocoat. In addition, the UV light stabilizer that may be present in the powder coating composition also contributes to the stability of the underlying electrocoat, although the UV light stabilizer may have little or no benefit to the powder coating composition itself.

The powder coating compositions of the invention may also include additives, such as without limitation, pigments, degassing agents, antioxidants, fillers, flow aids, catalysts, or a combination thereof.

Pigments for use in powder coating compositions of the invention include, for non-limiting example, titanium dioxide, iron oxide (yellow, brown, red, black), carbon black and organic pigments. These pigments can be added in conventional amounts known to those in the art.

A degassing agent can be added to the composition to allow any volatile material present to escape from the film during baking. Benzoin is an example of a degassing agent and when used in some embodiments can be present in amounts from about 0.05 to about 0.8 wt % of the powder coating composition.

Suitable antioxidants include, without limitation, phenolic, phosphite, phosphonite and lactone-type antioxidants, such as octadecyl-3-(3,5-Di-tert-butyl-4-hydroxyphenyl)-propionate and pentaerythritol tetrakis(3-(3,5-di-tert-butyl-4-hydroxyphenyl)-propionate, as well as combinations thereof. In some embodiments, the antioxidant is present in an amount of from about 1 to about 3 wt % of the powder coating composition.

The powder coating compositions of the invention may include one or more catalysts to accelerate the cure or otherwise catalyze the system to enhance the properties of the coating composition. Suitable catalysts include without limitation accelerated phenolic resins, alkyl ammonium salts, such as tetra butyl ammonium bromide, tetra butyl ammonium chloride, tetra butyl ammonium iodide and benzyltriethylammonium chloride, quaternary ammonium and phosphonium salts, phosphines, imidazoles, such as 2-methyl imidazole and 2-heptadecylimidazole, metal salts, 2,4-diamino-6 (2-methylimidazolyl-(1))-ethyl-s-triazine, tin salts such as dibutyl tin dilaurate, ethyltriphenyl phosphonium acetate, triphenylphosphine, or a combination thereof. In some embodiments, the catalyst is present in an amount of from about 0.05 to about 1.5 wt % of the coating composition.

The powder coating compositions of the present invention are suitable for application to substrates, such as, without limitation, automotive bodies. However, it is also possible to apply the coating compositions to carbon, wood, glass, polymers, plastics and other substrates.

Application of the above described powder coating compositions can be accomplished by any known techniques, such as, without limitation, electrostatic spray or fluidized bed.

EXAMPLES

The invention will be further described by reference to the following non-limiting examples. It should be understood that variations and modifications of these examples can be made by those skilled in the art without departing from the spirit and scope of the invention.

Coating Compositions 1 through 6 were prepared by ensuring that the ingredients listed were (1) Physically mixed under dry, non-molten conditions, i.e. in the solid state and without substantial melting of the components being mixed by use of a bladed mixer, whereby the combined ingredients were generally uniformly distributed throughout the resulting mixture. (2) Melt-mixed under conditions in which the mixture was generally in a liquid condition, although some components of the mixture could have been present as suspended or dispersed solids or could have been dissolved rather than molten. Melt mixing was accomplished by the use of a twin screw extruder at elevated temperature. (3) Cooled by passing through a pair of chill rolls. (4) Discharged into a mill where it was ground into small particles. (5) Sieved for further particle size classification.

TABLE 1

| Ingredients | Comp 1 | Comp 2 | Comp 3 | Comp 4 | Comp 5 | Comp 6 | Attributes |
|---|---|---|---|---|---|---|---|
| Composition in parts by weight | | | | | | | |
| GMA Acrylic Resin A | 35-40 | | | | 35-40 | | Acrylic resin. |
| Carboxyl Acrylic Resin | | 46-62 | 46-62 | | | | Acrylic resin. |
| Hydroxyl Acrylic Resin | | | | 50-60 | | 4-6 | Acrylic resin. |
| Hydroxyl Acrylic Resin C[26] | | | | | | 30-45 | Acrylic resin. |
| Low EEW GMA Acrylic Resin | | | 8.5-10.5 | | | | Acrylic resin. |
| Aliphatic Polyanhydride Dibasic Acid | 12-16 | | | | 9-10 | | |
| Hydroxyalkylamide | | 2.5-3.3 | | | | | |
| Tetramethoxymethyl glycoluril | | | | 4-6 | | | |
| Polyisocyanate curing agent | | | | | | 15-20 | |
| Accelerated Phenolic Resin | 0.4-0.6 | | | | 0.4-0.6 | | Catalyst. |
| Tetra butyl ammonium bromide | 0.3-0.5 | | | | 0.3-0.5 | | Catalyst. |
| 2,4-diamino-6(2-methylimidazolyl-(1))-ethyl-s-triazine | | | 0.2-0.3 | | | | Catalyst. |
| Strong Acid Catalyst Masterbatch | | | | 0.2-0.8 | | | Catalyst. |
| Dibutyl tin dilaurate | | | | | | 0.1-0.3 | Catalyst. |
| Benzoin | 0-0.8 | 0-0.8 | 0-0.8 | 0-0.8 | 0-0.8 | 0-0.8 | |
| Octadecyl-3-(3,5-Di-tert-butyl-4-hydroxyphenyl)-propionate | 1-3 | | | | 1-3 | | |
| Pentaerythritol tetrakis (3-(3,5-di-tert-butyl-4-hydroxyphenyl)propionate) | | 0.1-0.3 | 0.1-0.3 | 0.1-0.3 | | 0.1-0.3 | |
| Hydroxyphenyl benzotriazole | 1-3 | 1-3 | 1-3 | 1-3 | 1-3 | 1-3 | UV absorber |
| Hindered Amine Light Stabilizer | 0.5-1.5 | | | | 0.5-1.5 | | Light Stabilizer |
| PTFE powder[1] | 0.1-0.2 | 0.1-0.2 | 0.1-0.2 | 0.1-0.2 | 0.1-0.2 | 0.1-0.2 | Texturing additive. |
| Barium Sulfate[2] (BaSO$_4$) | 0.2-1.0 | 0.2-1.0 | 0.2-1.0 | 0.2-1.0 | 0.2-1.0 | 0.2-1.0 | Filler |
| Aluminum Oxide[3] (Al$_2$O$_3$) | .03-.07 | .03-.07 | .03-.07 | .03-.07 | .03-.07 | .03-.07 | |
| Carbon Black | 1.5-3.0 | 1.5-3.0 | 1.5-3.0 | 1.5-3.0 | 1.5-3.0 | 1.5-3.0 | |
| Magnesium Silicate[4] | 3-8 | 3-8 | 3-8 | 3-8 | 3-8 | 3-8 | Matting agent. |
| Aluminum Trihydrate[5] | 25-35 | 25-35 | 25-35 | 25-35 | 25-35 | 25-35 | Filler |
| Silicon Dioxide[6] | 0.1-0.3 | 0.1-0.3 | 0.1-0.3 | 0.1-0.3 | 0.1-0.3 | 0.1-0.3 | Matting agent. |
| Total | 100.0 | 100.0 | 100.0 | 100.0 | 100.0 | 100.0 | |

[1] PTFE powder with average particle size of 15 μm.
[2] Barium sulfate with mean particle size of 2.5-3 μm.
[3] Aluminum oxide with an average primary particle size of 13 nm
[4] Magnesium Silicate with a median particle size of 2-3 μm.
[5] Aluminum Trihydrate with a median particle size of 10 μm.
[6] Silicon Dioxide with a median particle size of 10

Compositions 1 through 5 were coated, cured and evaluated for various properties. The evaluation results are shown in the following table.

TABLE 2

Evaluation results

| Chemistry | Comp 1 | Comp 2 | Comp 3 | Comp 4 | Comp 5 | Comp 6 |
| --- | --- | --- | --- | --- | --- | --- |
| Film Build (μ) ASTM D7081-05 | 68 | 75 | 73 | 93 | 69 | 71 |
| Substrate | B1000 | B1000 | B1000 | B1000 | CRS | B1000 |
| Cure | 15/180 C. | 20/193 C. | 20/193 C. | 20/193 C. | 15/180 C. | 20/193 C. |
| 20° Gloss ASTM D523-08 | 0.1 | 0.1 | 0.0 | 0.0 | 0.1 | 0.0 |
| 60° Gloss ASTM D523-08 | 2.2 | 2.1 | 1.4 | 0.6 | 1.1 | 1.5 |
| Appearance | Fine texture | Fine texture | Fine texture | Fine texture | Fine texture | Fine texture |
| Gel Time (200° C.) | 36" | 52" | 21" | 66" | 31" | 46" |
| Pill Flow (149° C.) | 12 mm | 14 mm | 13 mm | 13 mm | 12 mm | 13 mm |
| Direct Impact (in-lbs) ASTM D2794-93 | 160 | 120 | 80 | 160 | 160 | 160 |
| Reverse Impact (in-lbs) ASTM D2794-93 | 160 | 40 | 20 | 40 | 120 | 80 |
| Crosshatch Adhesion ASTM D3359-09 | 5B | 4B | 4B | 5B | 5B | 5B |
| Pencil Hardness ASTM D3363-05 | 3H | 4H | 3H | 4H | 4H | 4H |
| Tack Temperature (° C.) | 58 | 86 | 88 | 81 | 69 | 92 |
| Xylene (3 min spot test) | Pass | Pass | Pass | Pass | Pass | Pass |
| Ethanol (3 min spot test) | Pass | Pass | Pass | Pass | Pass | Pass |
| Isooctane/toluene (24 hr spot test) | Pass | Pass | Pass | Pass | Pass | Pass |

The following table and graph illustrates SAE J1961 EMMAQUA® accelerated outdoor weathering testing data for Compositions 1-4 and 6 above.

TABLE 3

SAEJ1961 EMMAQUE® test results

| Product Code/ID | ΔE Color | ΔChroma | ΔHue |
| --- | --- | --- | --- |
| Comp. 1 | 0.35 | −0.29 | 0.13 |
| Comp. 2 | 1.26 | −0.05 | 0.05 |
| Comp. 3 | 2.92 | −0.34 | 0.55 |
| Comp. 6 | 3.78 | 0.54 | 0.04 |
| Comp. 4 | 1.17 | 1.15 | −0.16 |
| Comp. 5 | — | — | — |

The table above and graph denoted FIG. 1 demonstrate that Compositions 1-4 and 6 have acceptable color stability and durability.

The invention claimed is:

1. A powder coating composition comprising:
  a) an acrylic resin that includes a glycidyl methacrylate resin, a carboxyl acrylic resin, a hydroxyl acrylic/tetramethoxymethyl glycouril resin, or combination thereof;
  b) a UV light stabilizer;
  c) a matting agent; and
  d) a texturing additive,
  wherein a monocoat film with a measured film thickness of 50 to about 100 μm cured from the powder coating composition has a matte-textured finish and a non-uniform thickness with hills and valleys having a valley:hill thickness ratio from about 1:4 to about 1:2, exhibits a 60-degree gloss of less than about 10, transmits less than about 0.1% of UV light at 290 nm and less than about 0.5% of UV light at 400 nm.

2. The powder coating composition of claim 1, wherein the carboxyl acrylic resin comprises a carboxyl acrylic resin/betahydroxyalkylamide resin system.

3. The powder coating composition of claim 1, further comprising a curing agent and/or a co-reacting resin.

4. The powder coating composition of claim 3 wherein the curing agent and/or co-reacting resin comprises an aliphatic polyanhydride, a dibasic acid, a hydroxyalkylamide, triglycidyl isocyanurate, a glycidyl methacrylate acrylic resin, a polyester resin, a hydrogenated Bisphenol A epoxy resin, a tetramethoxymethyl glycoluril, a polyisocyanate curing agent, or a combination thereof.

5. The powder coating composition of claim 3 wherein the curing agent and/or co-reacting resin is present in an amount from about 2 to about 30 weight % of the powder coating composition.

6. The powder coating composition of claim 1, wherein the UV light stabilizer is at least one of a hydroxyphenyl benzotriazole, a hindered amine light stabilizer, an oxalanilide, a hydroxybenzophenone, or a hydroxyphenyl-s-triazine.

7. The powder coating composition of claim 1, wherein the matting agent includes at least one of barium sulfate, magnesium silicate, silicon dioxide, an alumino silicate, an alkali alumino silicate ceramic microsphere, an alumino silicate glass microsphere or flake, a polyolefin wax in combination with the salt of an organic anion, or a polymeric wax additive.

8. The powder coating composition of claim 1, wherein the texturing additive includes at least one of a polytetrafluoroethylene powder, a PTFE/polyethylene wax mixture, or a PTFE/talc.

9. The powder composition of claim 1, further comprising one or more of a pigment, a degassing agent, an antioxidant, a filler, a flow aid, or a catalyst.

10. The powder coating composition of claim 1 wherein the acrylic resin is present in an amount from about 25 weight % to about 65 weight % of the powder coating composition.

11. The powder coating composition of claim 1 wherein the UV light stabilizer is present in an amount from about 0.1 weight % to about 5 weight % of the powder coating composition.

12. The powder coating composition of claim 1 wherein the matting agent is present in an amount from about 0.1 weight % to about 40 weight % of the powder coating composition.

* * * * *